United States Patent
Iguchi et al.

(10) Patent No.: US 10,084,216 B2
(45) Date of Patent: Sep. 25, 2018

(54) BATTERY COOLING STRUCTURE AND THE COVER PLATE

(71) Applicant: NISSAN MOTOR CO., LTD., Kanagawa (JP)

(72) Inventors: Toyoki Iguchi, Kanagawa (JP); Hiroaki Saitou, Kanagawa (JP); Koji Katou, Kanagawa (JP); Yuuta Yamagata, Kanagawa (JP); Shigeyuki Kiyota, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 0 days.

(21) Appl. No.: 15/507,092

(22) PCT Filed: Aug. 29, 2014

(86) PCT No.: PCT/JP2014/004446
§ 371 (c)(1),
(2) Date: Feb. 27, 2017

(87) PCT Pub. No.: WO2016/030932
PCT Pub. Date: Mar. 3, 2016

(65) Prior Publication Data
US 2017/0288284 A1 Oct. 5, 2017

(51) Int. Cl.
*H01M 10/613* (2014.01)
*H01M 10/6563* (2014.01)
(Continued)

(52) U.S. Cl.
CPC ....... *H01M 10/613* (2015.04); *H01M 10/625* (2015.04); *H01M 10/6556* (2015.04); *H01M 10/6563* (2015.04)

(58) Field of Classification Search
None
See application file for complete search history.

(56) References Cited

U.S. PATENT DOCUMENTS

| 2010/0231035 A1 | 9/2010 | Tsuchiya et al. |
| 2013/0140101 A1* | 6/2013 | Lim .......... B60K 1/04 180/68.5 |
| 2015/0270589 A1 | 9/2015 | Ejiri et al. |

FOREIGN PATENT DOCUMENTS

| CN | 101389502 A | 3/2009 |
| JP | 2007-299592 A | 11/2007 |

(Continued)

OTHER PUBLICATIONS

International Preliminary Report on Patentability issued in corresponding Application No. PCT/JP2014/004446, dated Mar. 9, 2017 (13 pages).

*Primary Examiner* — Daniel S Gatewood
(74) *Attorney, Agent, or Firm* — Osha Liang LLP (57) ABSTRACT

A battery cooling structure has a plurality of cooling passages that are formed on a surface of a cover plate attachable to a battery pack and that are for taking in cooling air into the battery pack, and a connection passage that is formed in a direction intersecting with the plurality of cooling passages on the surface of the cover plate, and that connects the plurality of cooling passages with one another to allow interchange of the cooling air. The battery pack is arranged in a center console box between a driver seat and a front passenger seat of a vehicle. The cover plate is attached to a side surface of the battery pack. The plurality of cooling passages extend in parallel with one another and in a direction vertical to a floor surface. Partial portions of the cooling passages on a floor surface side are open.

7 Claims, 6 Drawing Sheets (51) Int. Cl.
*H01M 10/625* (2014.01)
*H01M 10/6556* (2014.01)

(56) References Cited

FOREIGN PATENT DOCUMENTS

| | | | |
|---|---|---|---|
| JP | 2011-023301 A | | 2/2011 |
| JP | 2012-084363 A | | 4/2012 |
| JP | 2012084363 A | * | 4/2012 |
| JP | 2013-116724 A | | 6/2013 |
| JP | 2013-168318 A | | 8/2013 |
| JP | 2013168318 A | * | 8/2013 |
| WO | 2014/061814 A1 | | 4/2014 |

* cited by examiner

BATTERY COOLING STRUCTURE AND THE COVER PLATE

BACKGROUND

Technical Field

The present invention relates to a battery cooling structure for cooling a battery.

Related Art

Electric automobiles using an electric motor as a drive source, automobiles using a combination of an electric motor and an internal combustion engine (so-called hybrid vehicles) as a drive source, and the like incorporate a battery for supplying electricity as energy to the electric motor. The battery used is a repeatedly chargeable and dischargeable secondary battery, such as a lithium ion battery. A secondary battery is formed by battery modules including stacked battery cells, and is incorporated in an automobile, in a state where the battery modules are housed in a battery case. A product including the battery case, the battery modules housed in the battery case, and other internal constituent components is referred to as battery pack. To the battery pack, a cooling device, such as a fan or a duct, for taking in cooling air to an inside of the battery pack is attached in order to control the temperature of the battery modules housed thereinside.

In recent years, a battery pack has sometimes been placed in a center console box arranged between a driver seat and a front passenger seat, as a place for incorporating a secondary battery in an automobile, due to requirements for ambient temperature and layout. In such a case, the battery case includes a cover portion provided to surround a battery and an extension portion protruding from the cover portion to a duct. The duct is arranged to be spaced apart from the cover portion, attached to the extension portion, and fixed to a floor panel via the battery case (see PTL 1).

PTL 1: JP 2007-299592 A

SUMMARY

However, the inside of the center console box between the driver seat and the front passenger seat is a limited space, and thus it cannot be said that there is an enough space to arrange the duct around the battery pack. Additionally, when an object is placed around the center console box, the duct is pressed and sometimes blocked, which can cause obstruction of cooling air flow.

A battery cooling structure according to one or more embodiments of the present invention that integrates a battery pack with cooling passages (pipes through which cooling air passes) and avoids obstruction of cooling air flow due to blockage of the cooling passages.

In a battery cooling structure according to one or more embodiments of the present invention, a plurality of cooling passages for taking in cooling air into a battery pack are formed on a surface of a cover plate attachable to the battery pack. Additionally, a connection passage that connects the plurality of cooling passages with one another to allow interchange of cooling air is formed in a direction intersecting with the plurality of cooling passages on the surface of the cover plate.

According to one or more embodiments of the present invention, the cooling passages and the connection passage are formed on the surface of the cover plate attachable to the battery pack, so that it is unnecessary to secure an extra space around and inside the battery pack. Additionally, the plurality of cooling passages are formed on the surface of the cover plate, and the connection passage is formed between the cooling passages, whereby when any of the cooling passages is blocked, cooling air can be supplied from the other cooling passage(s) via the connection passage.

BRIEF DESCRIPTION OF THE DRAWINGS

FIGS. 1A to 1C are diagrams depicting a structural example of the external appearance of a battery pack according to one or more embodiments of the present invention, in which

FIGS. 3A and 3B are illustrative diagrams of a cooling air flow in the entire battery pack, in which

DETAILED DESCRIPTION

Hereinafter, embodiments of the present invention will be described with reference to the accompanying drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

(Structure)

Figures 1A, 1B, 1C:
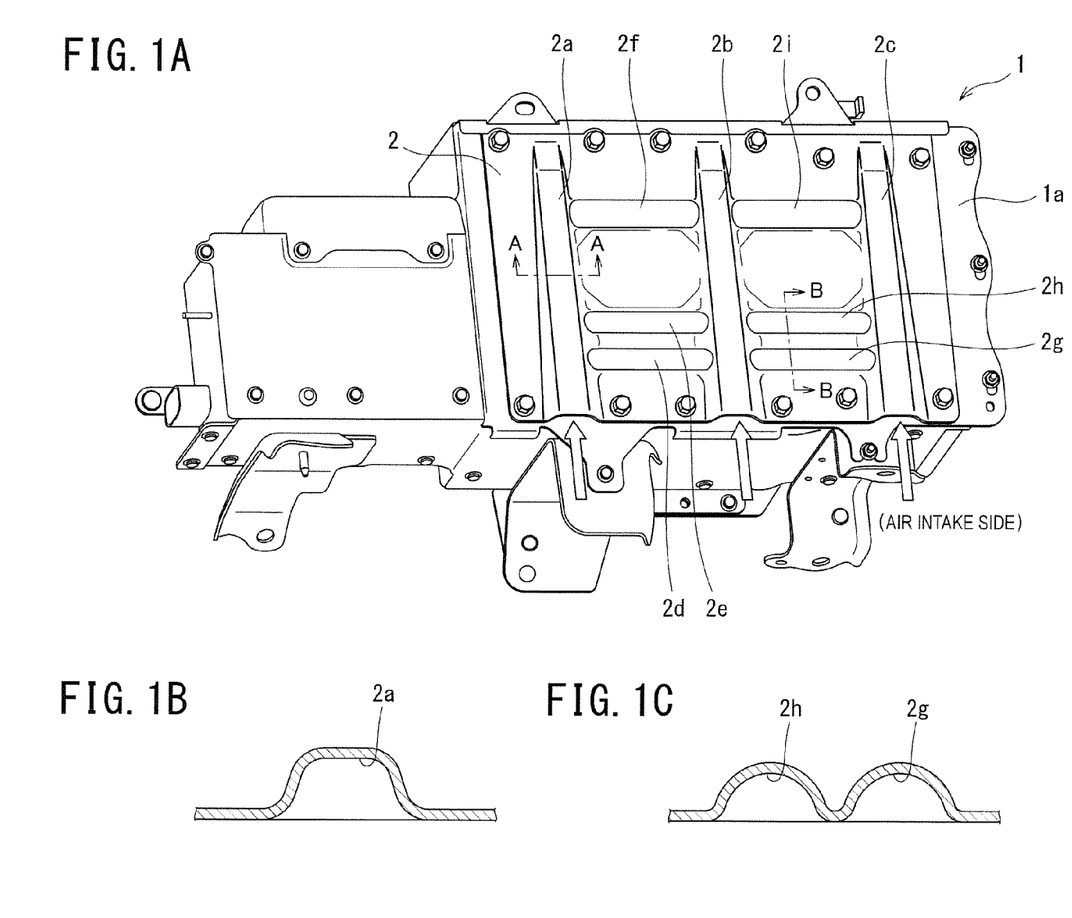
FIG. 1A is an external appearance diagram of the air intake side of the battery pack.
FIG. 1B is a cross-sectional diagram taken along line A-A.
FIG. 1C is a cross-sectional diagram taken along line B-B.

A battery cooling structure according to one or more embodiments is actualized in a battery pack 1 as depicted in FIG. 1A. A cover plate 2 is attached to a side surface on an air intake side of the battery pack 1. For example, the cover plate 2 is a panel, such as a metal plate. Here, the cover plate 2 is attached to a side surface plate 1a (a side plate) on the air intake side of the battery pack 1. According to one or more embodiments of the present invention, the cover plate 2 may be integrated with the side surface plate 1a on the air intake side of the battery pack 1. Alternatively, the cover plate 2 itself may be the side surface plate 1a on the air intake side of the battery pack 1.

On a surface of the cover plate 2, cooling passages 2a, 2b, and 2c for taking in cooling air into the battery pack 1 and connection passages 2d, 2e, 2f, 2g, 2h, and 2i that connect the cooling passages with one another are provided. As depicted in FIGS. 1B and 1C, inside each of the cooling passages 2a, 2b, and 2c and the connection passages 2d, 2e, 2f, 2g, 2h, and 2i, there is a hollow cavity through which cooling air can pass. Here, since a cooling air system is assumed, cooling air (such as air) is used as a cooling medium.

In addition, the cooling passages 2a, 2b, and 2c and the connection passages 2d, 2e, 2f, 2g, 2h, and 2i are cross-sectionally concave grooves integrally molded with the cover plate 2 by sheet metal processing (such as bending processing or press processing). Here, the cooling passages 2a, 2b, and 2c and the connection passages 2d, 2e, 2f, 2g, 2h, and 2i are protuberant on a front surface of the cover plate 2 and form cross-sectionally concave grooves on a back surface of the cover plate 2. Due to the formation on the surface of the cover plate 2 by sheet metal processing, the cooling passages 2a, 2b, and 2c and the connection passages 2d, 2e, 2f, 2g, 2h, and 2i can be more easily formed as compared to a case of arranging and connecting pipes around the battery pack 1. Additionally, it is also easy to perform layout design and change. However, the above structure is merely one example. According to one or more embodiments of the present invention, the numbers of the cooling passages and the connection passages are optional. In addition, the formation method therefor is not limited to sheet metal processing, and the passages may be integrally molded with the cover plate 2 by a hardening resin or the like.

The cooling passages 2a and 2b are connected to each other by the connection passages 2d, 2e, and 2f to form passages for cooling air. The cooling passages 2b and 2c are connected to each other by the connection passages 2g, 2h, and 2i to form passages for cooling air.

In addition, as depicted in FIG. 1A, the cooling passages 2a, 2b, and 2c extend in parallel to one another and in a direction vertical to a floor surface 10 (such as a floor panel), and partial portions of a lower floor surface side are open. For example, end faces of the cooling passages 2a, 2b, and 2c on the lower floor surface side are open. Additionally, according to one or more embodiments of the present invention, side surfaces thereof on the lower floor surface side may be open. In other words, the partial opening portions thereof on the lower floor surface side become air intake ports. By doing this, an economical and compact layout can be achieved around the battery pack 1.

Here, in each of the cooling passages 2a, 2b, and 2c, the portion thereof on the lower floor surface side is widely open, and the inside hollow cavity is tapered toward an upper ceiling side (a top plate side of the battery pack 1). Additionally, the inside hollow cavity is blocked on the upper ceiling side. The front surfaces of the cooling passages 2a, 2b, and 2c are inclined so that downward slopes are formed from the lower floor surface side to the upper ceiling side. Due to this, on the upper ceiling side conspicuous to passengers, the cooling passages 2a, 2b, and 2c have a thickness close to that of the cover plate 2, so that the cooling passages 2a, 2b, and 2c on the surface of the cover plate 2 are inconspicuous. In addition, when interposing a book or paper between a driver seat or a front passenger seat and a center console box, the book or paper can be smoothly interposed without being obstructed by the cooling passages 2a, 2b, and 2c.

In addition, in the cooling passages 2a, 2b, and 2c, it is possible to open only partial portions thereof on the upper ceiling side or partial portions thereof on both of the upper ceiling side and the lower floor surface side. However, for example, in the case of the battery pack 1 incorporated in a vehicle, when the partial portions thereof on the upper ceiling side are open, the air intake ports are closer to a passenger(s), and a slight sound occurring upon air intake (a sound due to cooling air inflow) is more easily heard by the passenger(s) as compared to a case where only the partial portions thereof on the lower floor surface side are open. Thus, in terms of quietness (quiet performance), performance is inferior. In addition, when only the partial portions thereof on the upper ceiling side are open, and if an object is placed on the top plate of the battery pack 1 or the battery pack 1 is covered with something, all the air intake ports are blocked together, and therefore cooling air may be unable to be taken in. Thus, in the partial portions thereof on the upper ceiling side, all the air intake ports are easily blocked together than in the partial portions on the lower floor surface side. Accordingly, according to one or more embodiments of the present invention, only the partial portions thereof on the lower floor surface side are open.

In addition, as depicted in FIG. 1A, the connection passages 2d, 2e, 2f, 2g, 2h, and 2i are provided in parallel with one another and horizontally (parallel) to the floor surface 10. In other words, a direction in which the connection passages 2d, 2e, 2f, 2g, 2h, and 2i extend is a direction orthogonal to (intersecting with) a direction in which the cooling passages 2a, 2b, and 2c extend. Here, the cooling passages 2a, 2b, and 2c and the connection passages 2d, 2e, 2f, 2g, 2h, and 2i are arrayed in a grid form. However, according to one or more embodiments of the present invention, the cooling passages 2a, 2b, and 2c and the connection passages 2d, 2e, 2f, 2g, 2h, and 2i may be arrayed in a mesh form. In addition, the connection passages 2d, 2e, 2f, 2g, 2h, and 2i may be formed in a direction diagonally intersecting with the cooling passages 2a, 2b, and 2c or in an X-letter shape.

Even when the air intake port or the inside of any cooling passages 2a, 2b, and 2c is blocked, for example, due to suction or the like of a book or paper interposed between the driver seat or the front passenger seat and the center console box or dust dropped on the floor surface 10, the formation of the connection passages 2d, 2e, 2f, 2g, 2h, and 2i allows cooling air to be provided (supplied) to the cooling passage from the remaining cooling passages through the connection passages.

Additionally, with the formation of the connection passages 2d, 2e, 2f, 2g, 2h, and 2i, it is also possible to design so that the lower floor surface side portion of only any one of the cooling passages 2a, 2b, and 2c is open to form an air intake port, whereas no air intake port is formed in the other two cooling passages. In other words, as long as an air intake port is formed in at least one of the cooling passages 2a, 2b, and 2c, cooling air can be supplied to all of the cooling passages 2a, 2b, and 2c.

(Inside of Battery Pack)

Figure 2:
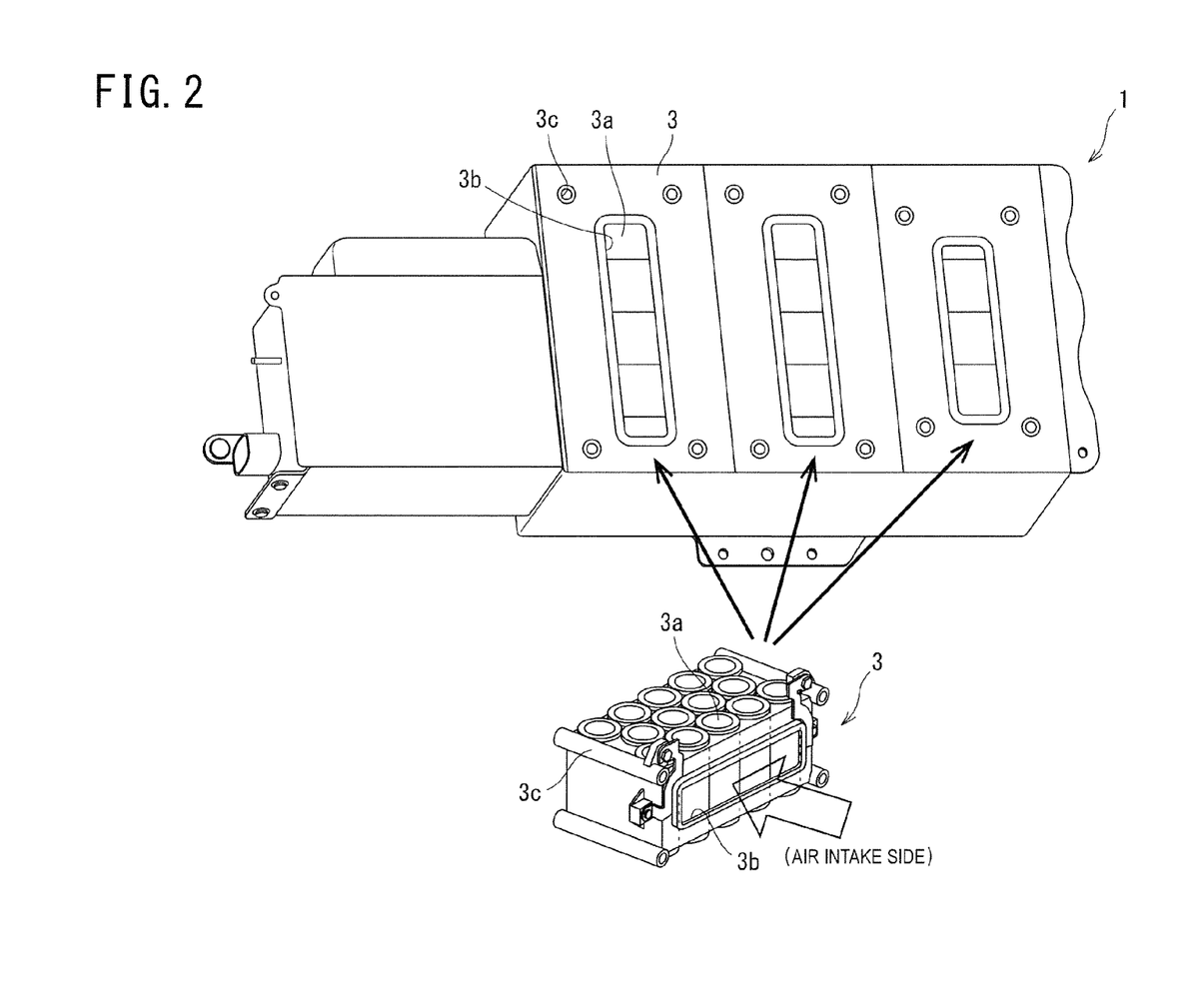
FIG. 2 is a diagram depicting a structural example of the inside of the battery pack according to one or more embodiments of the present invention.

As depicted in FIG. 2, the battery pack 1 houses a plurality of battery modules 3 in parallel. Each of the plurality of battery modules 3 houses a plurality of columnar battery cells 3a inside a casing (container) of a rectangular parallelepiped as a whole. For example, the battery cells 3a are cylindrical cells and housed in a staggered array in the battery module 3. Here, the battery pack 1 houses three battery modules 3. The individual battery modules 3 house 14 (5+4+5) battery cells 3a. However, the battery pack 1 is not limited to these examples.

In addition, on a first side surface of the casing of each battery module 3, an opening portion 3b for taking in cooling air inside the casing is provided. Although not illustrated, on a second side surface opposing the first side surface, another opening portion for exhausting cooling air from the inside of the casing is provided. Cooling air taken in from the opening portion 3b cools the housed battery cells 3*a*. The positions of the cooling passages 2*a*, 2*b*, and 2*c* provided on the cover plate 2 and exhausting ports for cooling air correspond to the position of the opening portion 3*b* provided in each battery module 3 housed in the battery pack 1. For example, the hollow cavities inside the cooling passages 2*a*, 2*b*, and 2*c* are directly connected to the opening portions 3*b* provided in the respective battery modules 3. Cooling air having passed through the cooling passages 2*a*, 2*b*, and 2*c* is taken in from the opening portions 3*b* of the respective battery modules 3 to the inside of the casing to cool the battery cells 3*a*.

(Flow of Cooling Air)

Figure 3A:
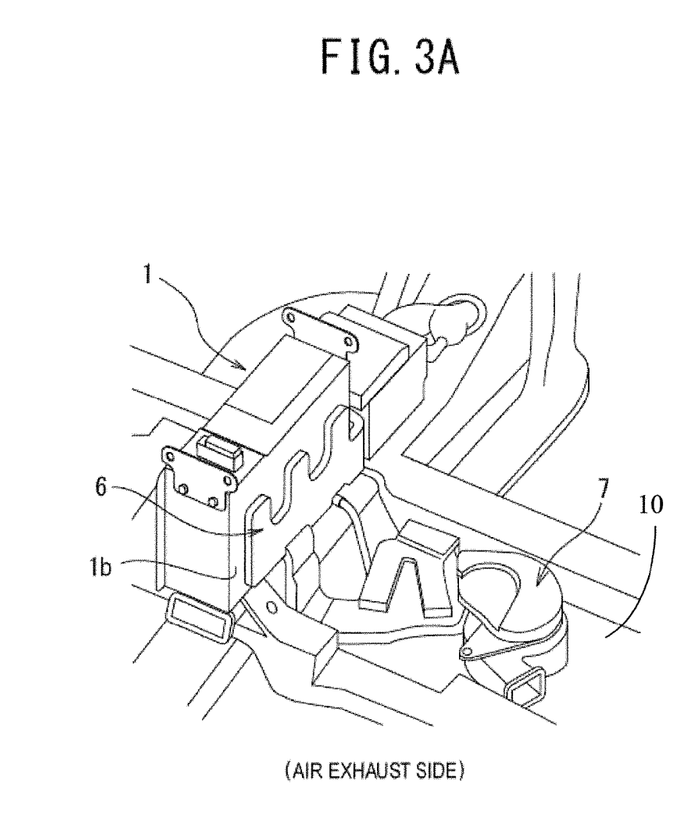
FIG. 3A is a diagram of surroundings of the battery pack as seen from an air exhaust side.

As depicted in FIG. 3A, a cover plate 6 is attached to a side surface on an air exhaust side of the battery pack 1. For example, the cover plate 6 is a panel, such as a metal plate. Here, the cover plate 6 is attached to a side surface plate 1*b* (a side plate) on the air exhaust side of the battery pack 1. According to one or more embodiments of the present invention, the cover plate 6 may be integrated with the side surface plate 1*b* on the air exhaust side of the battery pack 1. Alternatively, the cover plate 6 itself may be the side surface plate 1*b* on the air exhaust side of the battery pack 1. There is a hollow cavity inside the cover plate 6, in which a portion on a lower floor surface side thereof is open, and the opening portion is used as an air exhaust port. In addition, as in the cover plate 2 on the air intake side of the battery pack 1, cooling passages and connection passages may be formed also on a surface of the cover plate 6 on the air exhaust side of the battery pack 1, where partial portions of the cooling passages on the lower floor surface side may be open, and the opening portions may be used as air exhaust ports. The cover plate 6 is connected to an air exhaust fan 7 provided on the floor surface 10. The air exhaust fan 7 sucks out air inside the battery pack 1 from the air exhaust port provided in the cover plate 6 on the air exhaust side of the battery pack 1, whereby cooling air is sucked into the inside of the battery pack 1 from the opening portions (air intake ports) of the cooling passages 2*a*, 2*b*, and 2*c* on the air intake side of the battery pack 1.

Figure 3B:
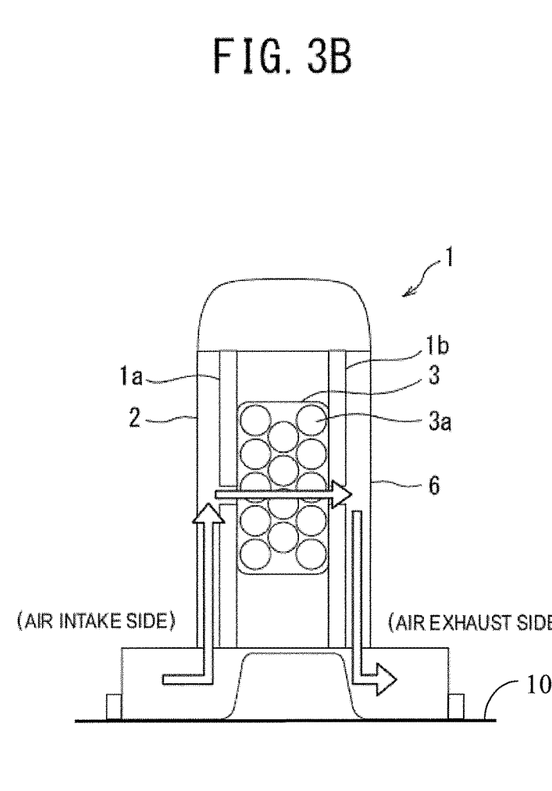
FIG. 3B is a diagram depicting the cooling air flow inside the battery pack.

As depicted in FIG. 3B, cooling air is sucked into the air intake ports of the cooling passages 2*a*, 2*b*, and 2*c* from the lower floor surface side, passes through the insides of the battery modules 3, goes from the air exhaust port of the cover plate 6 to the lower floor surface side, and is sucked out by the air exhaust fan 7 on the floor surface 10. For example, the cooling air is an in-vehicle air cooled by an air conditioner or the like. The cooling air is sucked in from the air intake ports of the cooling passages 2*a*, 2*b*, and 2*c*, passes through the insides of the battery modules 3, and is sucked out from the air exhaust port of the cover plate 6. After that, for example, the cooling air may circulate in the vehicle and, again, may be sucked in from the air intake ports of the cooling passages 2*a*, 2*b*, and 2*c*.

As described above, when structured so that cooling air is sucked in from the air intake ports not by pushing cooling air into the air intake ports but by sucking out air inside the battery pack 1 from the air exhaust port, it is difficult to completely prevent intrusion of a foreign object into the air intake ports or wash away a foreign object stuck in the air intake ports or the cooling passages by the cooling air. Thus, it is significantly meaningful to form the connection passages 2*d*, 2*e*, 2*f*, 2*g*, 2*h*, and 2*i* among the cooling passages 2*a*, 2*b*, and 2*c* to allow the interchange of cooling air.

(Modifications)

If necessary, an intrusion prevention fence for preventing intrusion of a foreign object may be installed at the air intake ports, in the cooling passages, and/or in the connection passages. For example, as the intrusion prevention fence, a fence or a net may be installed or formed in the cooling passages. The intrusion prevention fence can have any shape such as a fence shape, a grid shape, a net shape, or a dot hole shape. In other words, any shape that does not obstruct the passage of cooling air as much as possible and can prevent intrusion of a foreign object may be employed.

According to one or more of the above embodiments, one or more of the following advantages may be achieved:

(1) In the battery cooling structure according to one or more of the above embodiments, the plurality of cooling passages for taking in cooling air into a battery pack are formed on a surface of the cover plate attachable to a side surface of the battery pack. Additionally, the connection passages that connect the plurality of cooling passages with one another to allow the interchange of cooling air are formed in the direction in which the connection passages intersect with the plurality of cooling passages on the surface of the cover plate.

In this manner, the plurality of cooling passages are formed on the surface of the cover plate attachable to the side surface of the battery pack, and the connection passages are formed between the cooling passages. Thereby, for example, when a certain cooling passages is blocked due to suction or the like of a book or paper interposed between a driver seat or a front passenger seat and a center console box or dust dropped on a floor surface, cooling air can be supplied from the other cooling passage(s) through the connection passages. In addition, since the cooling passages and the connection passages are formed on the surface of the cover plate, it is unnecessary to secure an extra space around or inside the battery pack, so that an economical and compact layout can be achieved.

(2) The cooling passages and the connection passages are the cross-sectionally concave grooves integrally molded with the cover plate.

By doing this, the cooling passages and the connection passages can be easily formed on the surface of the cover plate. Additionally, layout design and change can also be easily performed.

(3) The air exhaust fan provided on the air exhaust side of the battery pack sucks out cooling air inside the battery pack from the air exhaust side of the battery pack, whereby cooling air is sucked into the plurality of cooling passages.

With the installation of the fan on the air exhaust side, it is enough to merely provide the air intake ports for taking in cooling air and the cooling passages on the air intake side. In addition, since the cooling air inside the battery pack is sucked out from the air exhaust side, the cooling air can be more efficiently and surely exhausted from the inside of the battery pack as compared to the case in which cooling air is pushed into the battery pack from the air intake side.

(4) The battery pack is arranged in the center console box between the driver seat and the front passenger seat in the vehicle. The cover plate is attached to the side surface of the battery pack. The plurality of cooling passages extend in parallel with one another and in the direction vertical to the floor surface, and the partial portions thereof on the floor surface side are open.

As described above, since the opening portions (air intake ports) of the cooling passages are located on the floor surface side, as compared with a case where intake ports are provided at a top plate side of the battery pack, a slight sound that occurs upon air intake (a sound due to cooling air inflow) is hardly heard by a passenger(s) in the vehicle, so that favorable quiet performance can be obtained. In addition, even when an object is placed on the battery pack, there is no concern about blockage of the air intake ports.

Furthermore, when the structure of sucking in cooling air from the air intake ports on the air intake side, as in the above (3), is actualized, favorable quiet performance is obtained. Thus, the arrangement of the opening portions (air intake ports) of the cooling passages on the floor surface side has a significant meaning.

Hereinafter, further embodiments of the present invention will be described.

The structure of a battery pack 1 in the below embodiments is similar to that of one or more of the above embodiments.

Figure 4:
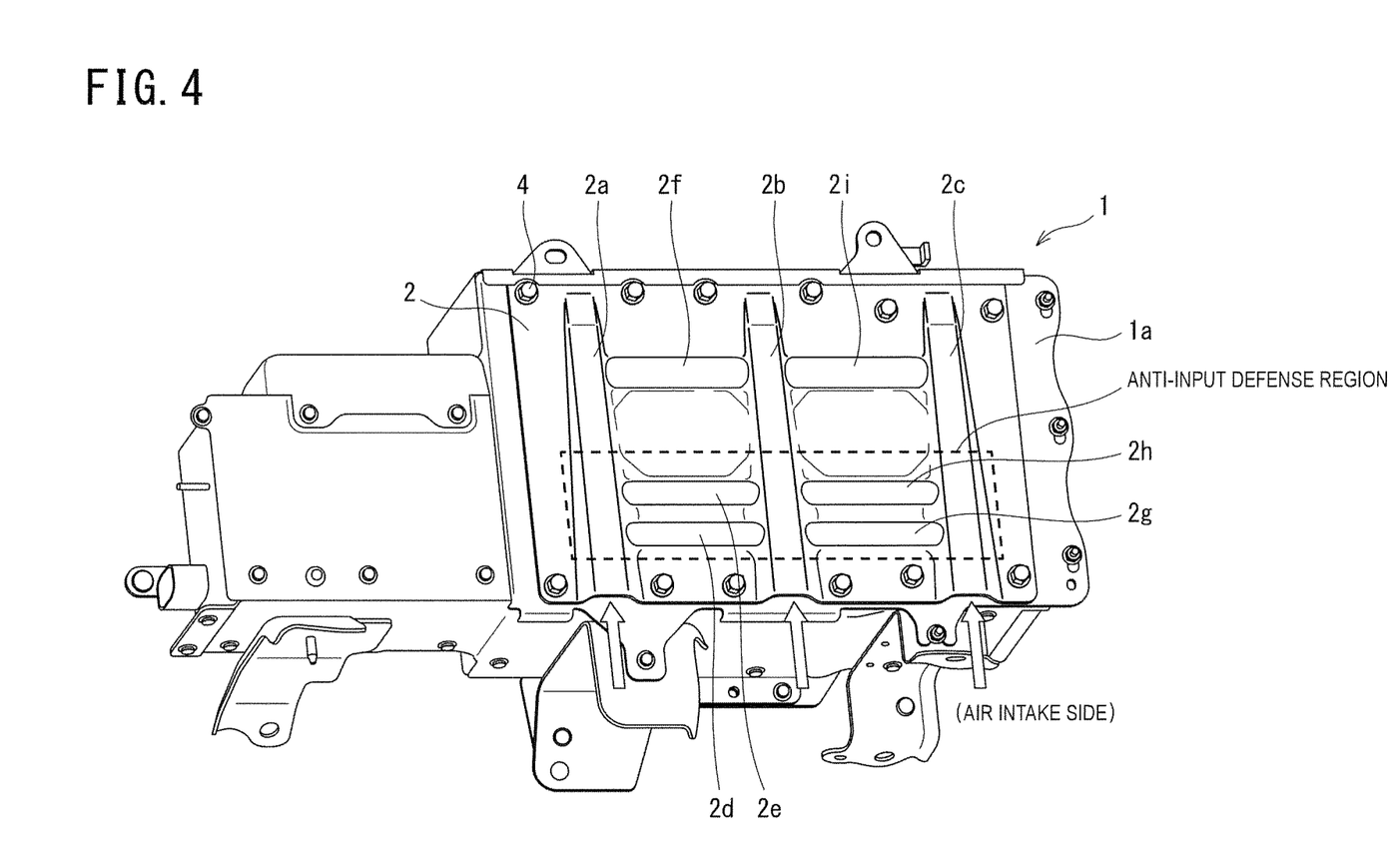
FIG. 4 is a diagram depicting a structural example of the external appearance of a battery pack according to one or more embodiments of the present invention.

The connection passages described above serve also as reinforcing members (ribs) for the cover plate against an input force (such as collision, hitting, or pressurization) from a direction vertical to the surface of the cover plate. As depicted in FIG. 4, in one or more embodiments of the present invention, the connection passages are intensively provided in a partial region on the surface of the cover plate 2, thereby forming "an anti-input force defense region" in which durability and rigidity against the input force from the direction vertical to the surface of the cover plate 2 are improved by the arrangement of the connection passages.

Figure 5:
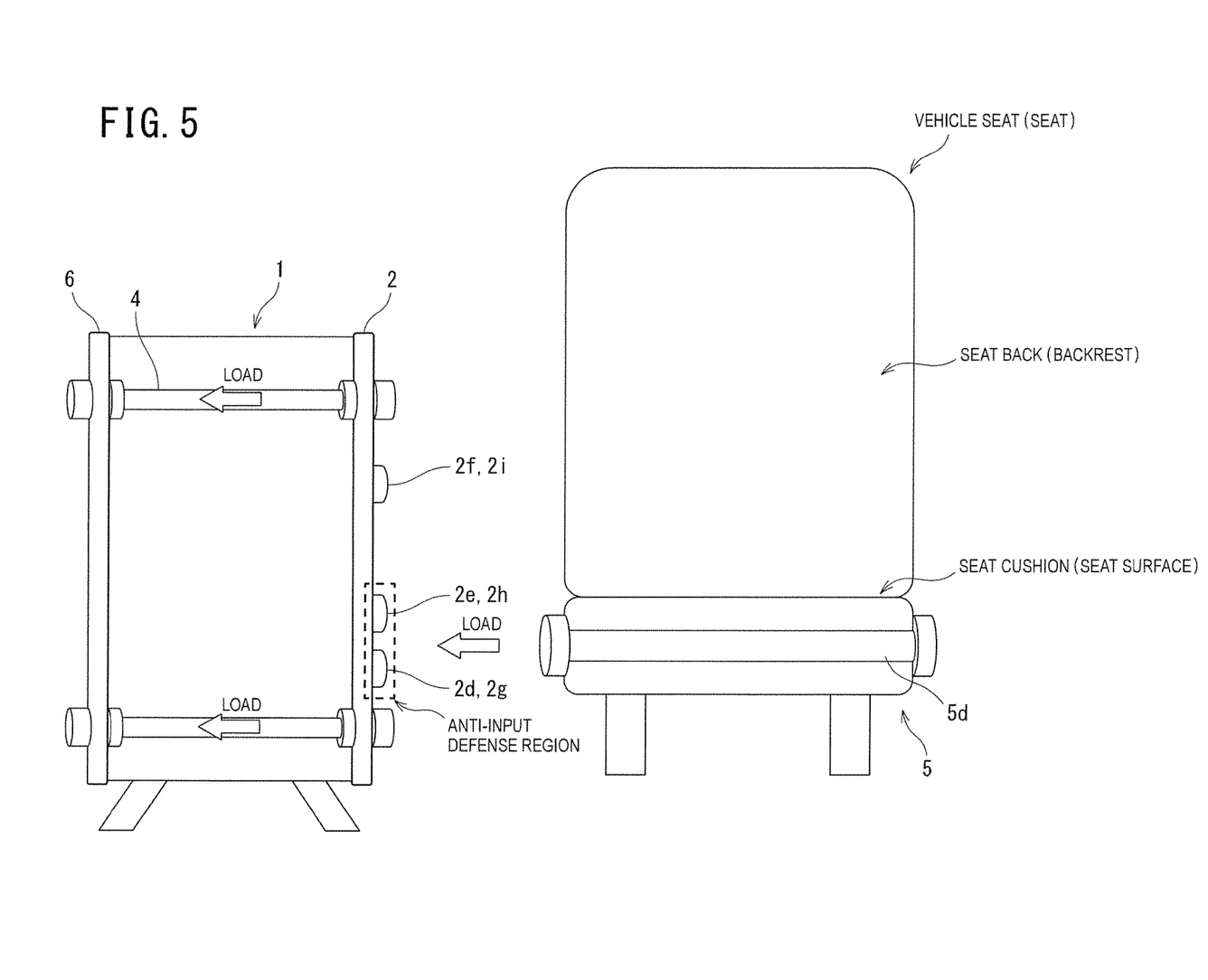
FIG. 5 is a diagram for illustrating an anti-input defense region according to one or more embodiments of the present invention.

For example, the battery pack 1 is arranged inside a center console box located between the driver seat and the front passenger seat in a vehicle. An ordinary vehicle seat (seat), such as a driver seat or a front passenger seat, includes a seat back (a backrest) that supports the back of a sitting person and a seat cushion (a seat surface) that supports the buttocks and the thighs of the sitting person, as depicted in FIG. 5. The seat cushion includes a seat cushion frame 5 forming a skeleton thereof.

Figure 6:
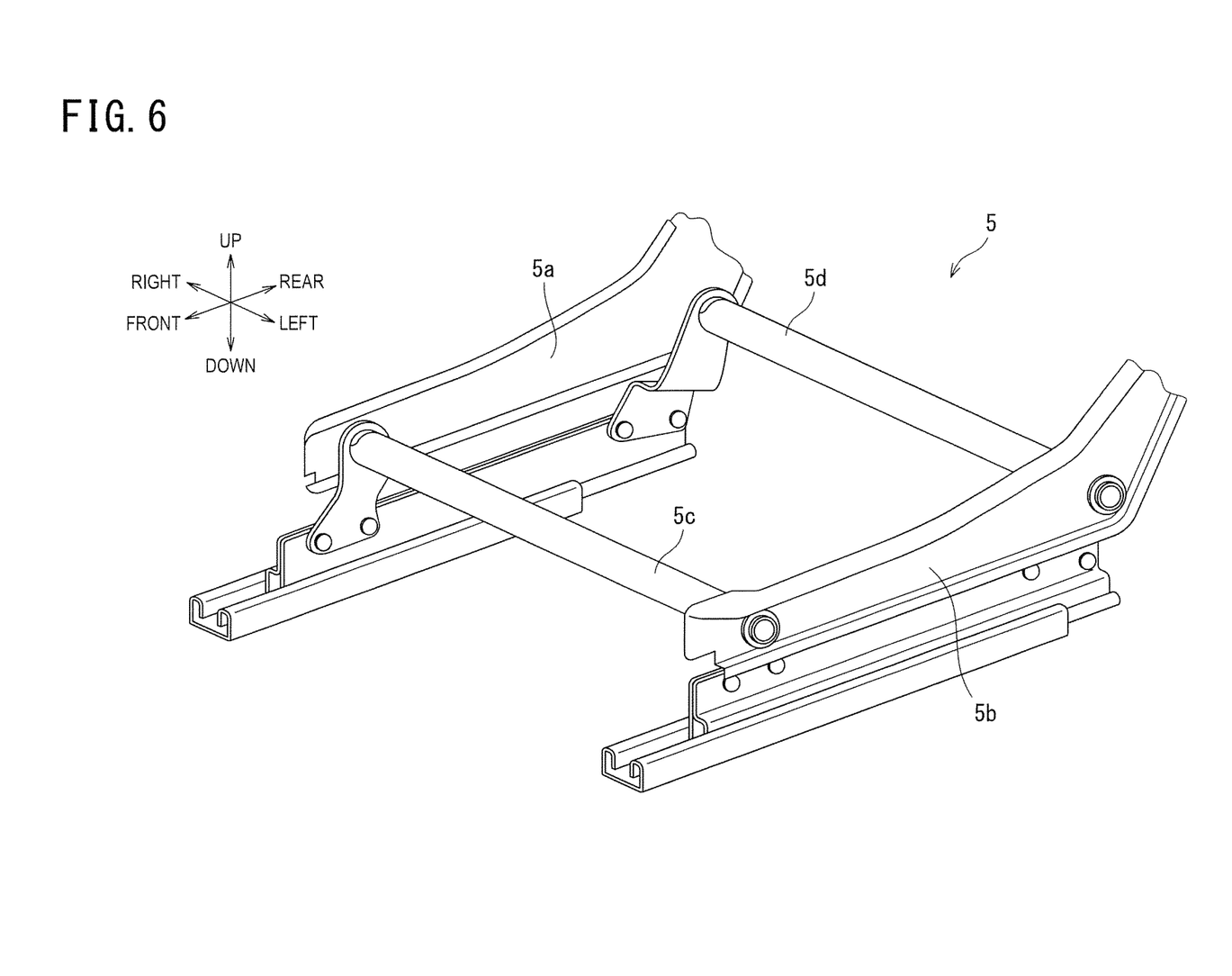
FIG. 6 is a diagram depicting a structural example of the seat cushion frame of a seat near the battery pack.

As depicted in FIG. 6, the seat cushion frame 5 is formed by including a pair of right and left side frames 5a and 5b extending in a front-and-rear direction of the seat, a front frame 5c connecting respective front ends of the side frames 5a and 5b, and a rear frame 5d connecting respective rear ends of the side frames 5a and 5b. The side frames 5a and 5b are formed by a sheet metal material. The front frame 5c and the rear frame 5d are formed of a cross-sectionally circular metallic pipe material. However, the material thereof is not limited to the cross-sectionally circular metallic pipe material.

In such a structure and such an arrangement state, when the vehicle receives an input force from a lateral direction due to some reason and the driver seat or the front passenger seat is moved, deformed, or broken, the rear frame 5d may apply a strong load to the cover plate 2 attached to the battery pack 1 due to the relation of the arrangement and strength, as depicted in FIG. 5.

Thus, as a countermeasure to be taken when a strong load is applied to the cover plate 2, one or more embodiments of the present invention causes the connection passages 2d and 2e to be formed close to each other so that a distance between the connection passages 2d and 2e becomes narrower than a distance between the connection passages 2e and 2f, as depicted in FIG. 4. Similarly, the connection passages 2g and 2h are formed to be close to each other so that a distance between the connection passages 2g and 2h becomes narrower than a distance between the connection passages 2h and 2i. In this manner, the region where the connection passages 2d and 2e and the connection passages 2g and 2h are formed becomes the "anti-input force defense region".

The connection passages 2d, 2e, 2g, and 2h in the anti-input force defense region are formed, on the surface of the cover plate 2, in a region corresponding to a movable range (a range in which movement is possible or a range in which position change is possible) of the pipe-shaped rear frame 5d included in the seat cushion frame 5 of a vehicle seat of either one of the driver seat and the front passenger seat close to the cover plate 2, which pipe-shaped rear frame connects the respective rear ends of the pair of right and left side frames 5a and 5b extending in the front-and-rear direction of the vehicle seat. Specifically, the connection passages 2d, 2e, 2g, and 2h are formed in a region corresponding to a range in which the rear frame 5d slides in the front-and-rear direction along with sliding of the vehicle seat in the front-and-rear direction and a range in which the position of the rear frame 5d changes in an up-and-down direction in accordance with a height adjustment on the vehicle seat in the up-and-down direction. In other words, even when a position at which the rear frame 5d contacts with the cover plate 2 is deviated in the up-and-down directions, it is adapted to fall within the range of the anti-input force defense region.

The anti-input force defense region on the surface of the cover plate 2 is larger in thickness by the amount of the provided connection passages 2d, 2e, 2g, and 2h than other regions to which no connection passages is provided, so that durability and rigidity against the input force are increased.

In addition, the parallel arrangement of the two connection passages (the connection passages 2d and 2e or the connection passages 2g and 2h) in the up-and-down direction in the anti-input force defense region structurally increases durability and rigidity against the input force, and load due to the input force can be dispersed to the two connection passages, as compared to the case of providing only one connection passage.

Additionally, as in the region corresponding to the movable range of the rear frame 5d, the connection passages may be intensively arranged (intensively formed) in a lower floor surface side region of the cover plate 2 to which load may be applied (for example, a region of the center and thereunder in a height direction of the cover plate 2). Specifically, on the surface of the cover plate 2, the number of the connection passages formed on the region closer to the lower floor surface side is increased than the upper ceiling side (the top plate side of the battery pack 1).

Additionally, when the connection passages 2d, 2e, 2g, and 2h receive an input force from the direction vertical to the surface of the cover plate 2, the connection passages 2d, 2e, 2g, and 2h are deformed, and then the deformed connection passages 2d, 2e, 2g, and 2h are supported by the cover plate 2 or, from the back thereof, by the side surface plate to which the cover plate 2 is attached, whereby influence of the input force on the inside of the battery pack 1 can be reduced.

Furthermore, as depicted in FIG. 2, each battery module 3 is provided with bolt holes 3c that are through holes. Here, four bolt holes 3c are provided at four corners (or near the four corners) of each battery module 3. Since the battery pack 1 itself houses the three battery modules 3, 12 bolt holes 3c in total are provided.

Here, as depicted in FIGS. 4 and 5, the cover plate 2 is connected to the cover plate 6 on an opposite side with the battery pack 1 therebetween via through bolts 4 that pass through the bolt holes 3c provided in the battery module 3 described above. According to one or more embodiments of the present invention, the cover plate 2 may be connected not to the cover plate 6 but to the side surface plate 1b on the air exhaust side of the battery pack 1 via the though bolts 4. Alternatively, instead of the cover plate 2 and the cover plate 6, the side surface plate 1a on the air intake side and the side surface plate 1b on the air exhaust side of the battery pack 1 may be connected via the through bolts 4. In this case, as for a method (attachment method) for connecting the cover plate 2 to the side surface plate 1a on the air intake side and a method for connecting the cover plate 6 to the side surface plate 1b on the air exhaust side, an existing connection method can be used, and thus the connection methods are not particularly limited. Ends of the through bolts 4 sandwich and fix the cover plate 2 and/or the side surface plate 1a on the air intake side (and also the cover plate 6 and/or the side surface plate 1b on the air exhaust side) by members corresponding to nuts and washers.

When a strong load is applied from the direction vertical to the anti-input force defense region, the cover plate 2 disperses the load to the plurality of through bolts 4, as depicted in FIG. 5, and transmits the load to the cover plate 6 on the opposite side via the through bolts 4. In this case, according to one or more embodiments of the present invention, by providing such a structure of directly transmitting the load from the cover plate 2 to the cover plate 6 via the through bolts 4, it is structured so that the load is not transmitted to the side surface plate 1a on the air intake side and the side surface plate 1b on the air exhaust side of the battery pack 1 as much as possible. For example, by using the cover plate 2, the through bolts 4, and the cover plate 6, a strong case is formed in a pseudo manner outside the side surfaces of the battery pack 1. In addition, when the cover plate 2 is integrated with the side surface plate 1a on the air intake side, and the cover plate 6 is integrated with the side surface plate 1b on the air exhaust side, if a load is applied to the anti-input force defense region of the cover plate 2, the load will be transmitted to the side surface plate 1b and the cover plate 6 on the air exhaust side of the opposite side via the through bolts 4. By transmitting the load to the opposite side, the transmission of the load to the inside of the battery pack 1 is prevented, suppressed, or reduced, thereby preventing deformation (particularly, crush) of the contents of the battery pack 1 (the battery modules 3, the battery cells 3a, and the like housed in the battery pack 1). In this manner, it is structured so that the contents of the battery pack 1 are defended (protected) by using the existing members, without using dedicated protection member and without producing new members.

(Modifications)

In addition, according to one or more embodiments of the present invention, the anti-input force defense region is formed as a presumed contactable range (a range in which it is presumed that contact can occur) more enlarged than the movable range of the rear frame 5d in preparation for a situation in which due to receipt of a strong impact, the rear frame 5d is protruded, deformed, or broken, and goes beyond the movable range to contact with the cover plate 2. The presumed contactable range encompasses the movable range of the rear frame 5d. Thus, the anti-input force defense region includes the region in which the rear frame 5d may contact with the cover plate 2.

In addition, according to one or more embodiments of the present invention, in order to adapt to a difference in position of the rear frame 5d due to a difference between vehicles, the entire region of the cover plate 2 on the lower floor surface side (for example, the region of the center and thereunder in the height direction of the cover plate 2) may be used as the presumed contactable range (or the anti-input force defense region).

In addition, according to one or more embodiments of the present invention, the through bolts 4 themselves may directly receive load due to the input force. For example, the ends of the through bolts 4 protruding on the surface of the cover plate 2 may directly receive load due to the input force. In other words, the through bolts 4 may also be a part of the anti-input force defense region. In this case, the anti-input force defense region includes the through bolts 4.

According to one or more of the above embodiments, similar advantages as those of the above embodiments may be achieved, and additionally, the one or more of the following advantages may be achieved:

(1) In the battery cooling structure according to one or more of the above embodiments, the connection passages are formed, as ribs for the cover plate, intensively in the region in which load is presumed to be applied on the surface of the cover plate.

In this manner, by devising the arrangement of the connection passages, the anti-input force defense region is formed by an assembly of the connection passages on the surface of the cover plate, whereby durability and rigidity against the input force from the side surface of the battery pack can be improved.

(2) In the battery cooling structure according to one or more of the above embodiments, the connection passages are formed, on the surface of the cover plate, in the region corresponding to the movable range of the pipe-shaped rear frame included in the seat cushion frame of the vehicle seat of either one of the driver seat and the front passenger seat, which pipe-shaped rear frame connects the respective rear ends of the pair of right and left side frames extending in the front-and-rear direction of the vehicle seat.

When the battery pack is arranged in the center console box between the driver seat and the front passenger seat in a vehicle, the rear frame of the vehicle seat close to the cover plate of the battery pack may apply a load to the surface of the cover plate of the battery pack upon emergency. Thus, by adapting the arrangement of the connection passages to the movable range of the rear frame, there can be formed an anti-input force defense region capable of properly receiving the load.

(3) The connection passages are formed in plurality, and the number of the connection passages is larger in the region closer to the floor surface side than the top plate side of the battery pack. In other words, the number of the connection passages formed in the region closer to the lower floor surface side is more increased than the number of the connection passages formed in the region closer to the upper top plate side of the battery pack.

Since the region of the lower floor surface side on the surface of the cover plate is considered to correspond to the movable range of the rear frame of the vehicle seat, the durability and rigidity of the cover plate can be properly improved by intensively arranging the connection passages in the region of the lower floor surface side.

(4) Load applied to the surface of the cover plate of the battery pack is transmitted to the cover plate on the opposite side of the battery pack via the through bolts.

By doing this, transmission of the load to the inside of the battery pack is prevented, thereby preventing deformation of the contents of the battery pack.

In addition, the respective embodiments described above can also be implemented by optionally combining them. While the embodiments of the present invention have been described in detail hereinabove, the invention is actually not limited thereto. The present invention encompasses changes made within a range not departing from the gist of the invention. While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

1 Battery pack
1a Side surface plate (air intake side)
1b Side surface plate (air exhaust side)
2 Cover plate (air intake side)
2a, 2b, 2c Cooling passage
2d, 2e, 2f, 2g, 2h, 2i Connection passage
3 Battery module
3a Battery cell
3b Opening portion
3c Bolt hole
4 Through bolt
5 Seat cushion frame
5a, 5b Side frame
5c Front frame
5d Rear frame
6 Cover plate (air exhaust side)
7 Air exhaust fan

The invention claimed is:

1. A battery cooling structure comprising:
a plurality of cooling passages that are formed on a surface of a cover plate attachable to a battery pack and that are for taking in cooling air into the battery pack; and
a connection passage that is formed in a direction intersecting with the plurality of cooling passages on the surface of the cover plate, and that connects the plurality of cooling passages with one another to allow interchange of the cooling air,
wherein the battery pack is arranged on a floor surface of a vehicle,
wherein the cover plate is attached to a side surface of the battery pack,
wherein the plurality of cooling passages extend in parallel with one another and in a direction vertical to the floor surface,
wherein the cooling passages have opening portions that are open to a floor surface side, respectively, and
wherein some of the opening portions are air intake ports.

2. The battery cooling structure according to claim 1, wherein the cooling passages and the connection passage are cross-sectionally concave grooves integrally molded with the cover plate.

3. The battery cooling structure according to claim 1, further comprising an air exhaust fan provided on an air exhaust side of the battery pack,
wherein the air exhaust fan sucks out the cooling air inside the battery pack from the air exhaust side of the battery pack such that the cooling air is sucked into the plurality of cooling passages.

4. The battery cooling structure according to claim 1,
wherein, on the surface of the cover plate, the connection passage is formed in a region at a lateral side of a movable range of a pipe-shaped rear frame included in a seat cushion frame of a vehicle seat close to the cover plate,
wherein the movable range is a range in which the pipe-shaped rear frame slides in a front-and-rear direction and in which a position of the pipe-shaped rear frame changes in an up-and-down direction, and
wherein the pipe-shaped rear frame connects respective rear ends of a pair of right and left side frames extending in the front-and-rear direction of the vehicle seat.

5. The battery cooling structure according to claim 1,
wherein the connection passage is formed in plurality, and
wherein the number of the connection passages is larger in a region closer to the floor surface side than a top plate side of the battery pack.

6. The battery cooling structure according to claim 1, further comprising a through bolt that transmits a load applied to the surface of the cover plate to another cover plate on an opposite side of the battery pack.

7. The battery cooling structure according to claim 1, wherein end faces of the plurality of the cooling passages on the floor surface side are open.

* * * * *